Sept. 20, 1960 H. HILFIKER ET AL 2,953,724

ELECTRICAL DISTRIBUTION BOARDS

Filed May 10, 1955

INVENTOR.
Hans Hilfiker
Albert Schreiber
BY
Michael S. Striker
agt.

2,953,724

ELECTRICAL DISTRIBUTION BOARDS

Hans Hilfiker, Landstrasse 129, Kilchberg ZH, Switzerland, and Albert Schreiber, Ackersteinstrasse 28, Zurich 10/49, Switzerland Filed May 10, 1955, Ser. No. 507,422

Claims priority, application Switzerland May 11, 1954

3 Claims. (Cl. 317—99)

Electrical distribution boards are already known having parallel to a horizontal, single or polyphase busbar not less than one connection bar for the fuses, a connection bar for the electrical switch elements, and a connection bar for the terminals of the branch circuits leading from the busbar.

An object of the present invention is to enable a considerable saving in material and space to be attained with such electrical distribution boards.

With this object in view the invention provides an electrical distribution board having not less than one, single or polyphase busbar and not less than one connection bar for the fuses of the branch circuits leading from such busbar, in which the front part of the switch casing and the terminals for the branch circuits leading from the busbar are completely identical in their external form, their overall front dimensions, their connections and their arrangement, and those on the same connection bar are arranged to be interchangeable.

It is advantageous in this regard to arrange the switching and actuating means of such switches, which are in many cases constructed as remote control switches with supplementary manual operation means and insofar as they cannot be accommodated in the front part of the switch casing, in a rear part attached to the preceding part, for which there is sufficient space behind the connection bar. This enables the switching and actuating elements of the switches to be accommodated without having recourse to a larger front casing than would correspond to a terminal strip or rail.

By comparison with the known forms of electrical distribution board initially mentioned, an electrical distribution board in accordance with the invention thus has one connection bar less because the electric switches and the terminal elements are arranged on the same connection bar. For branches from the busbar which do not require switching, the same, common connection bar is provided with a simple terminal, which is replaced in the case of branches requiring to be switched, by a corresponding switch; which, then, since its connections are completely identical and identically arranged, can simultaneously act as a terminal connection. In the known forms of electrical distribution board of the kind described, the electrical connections between the branch terminals of the busbar and the fuses as well as between the latter and the switches on the one hand or the terminals on the other hand, and between the switches and the terminals, have to be made by standardized connecting elements. In the case of the electrical distribution board according to the invention the requisite number of types of such standardized connectors is considerably reduced as only those types of electrical connectors are needed that serve to connect the branch terminals of the busbar with the fuses and the fuses with the terminals or the switches taking their place.

The accompanying drawing represents diagrammatically a portion of an electrical distribution board of known kind, and a portion of an example of a form or embodiment of an electrical distribution board in accordance with the invention.

Figure 1:
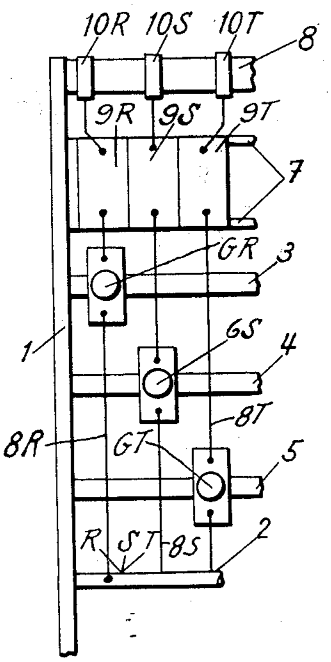
Fig. 1 is a front view of a portion of an electrical distribution board of known kind.

In Fig. 1, R, S, T, designate the conductors of a busbar 2 which are carried in a frame 1. Parallel to the conductors R.S.T. of the busbar 2 the frame 1 carries three further connection bars 3, 4 and 5. The connection bar 3 carrries the fuses 6R for the branches from conductor R of the busbar 2; the connection bar 4 carries the fuses 6S for the branches from the conductor S of the busbar 2; and the connection bar 5 carries the fuses 6T for the branches from the conductor T of the busbar 2. Above the connection bar 3 the frame 1 carries two further connection bars 7 and 8 parallel to the preceding. The connection bar 7 carries the switches 9R, 9S, 9T for the branches from the conductors R, S, T of the busbar 2; and the connection bar 8 carries the terminals 10R, 10S, 10T of these branches from the conductors R, S, T of the busbar 2. The electrical connections between the branch terminals on the conductors R, S, T of the busbar 2 and the fuses 6R, 6S, 6T; between these latter and the switches 9R, 9S, 9T; and between these and the terminals 10R, 10S, 10T are made by standardized electric connectors 8R, 8S and 8T. Switches 9R, 9S, 9T are provided only for such branch connections as require to be switched, while for such branches which do not require to be switched, the fuses 6R, 6S, 6T are directly connected electrically with the terminals 10R, 10S, 10T. The outgoing branch conductors are connected to the terminals 10R, 10S, 10T. The electrical distribution board represented posses in the frame 1 six steps or stages, viz., the busbar 2 with the conductors R, S, T, the three connection bars 3, 4 and 5 for the fuses 6R, 6S, 6T, the connection bar 7 for the switches 9R, 9S, 9T, and the connection bar 8 for the terminals 10R, 10S, 10T. The provision of the electrical connections in this case requires a considerable number of types of electrical connectors.

Figure 2:
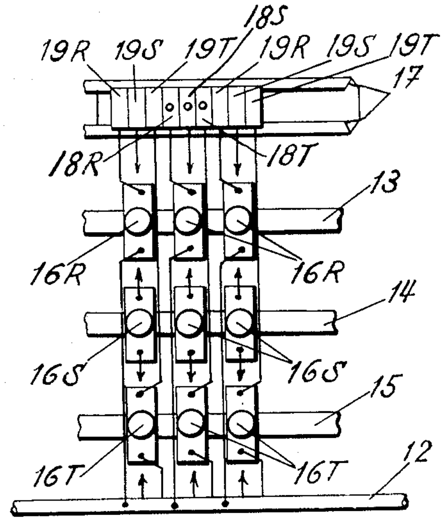
Fig. 2 is a front view of a portion of the electrical distribution board in accordance with the invention.
Figure 3:
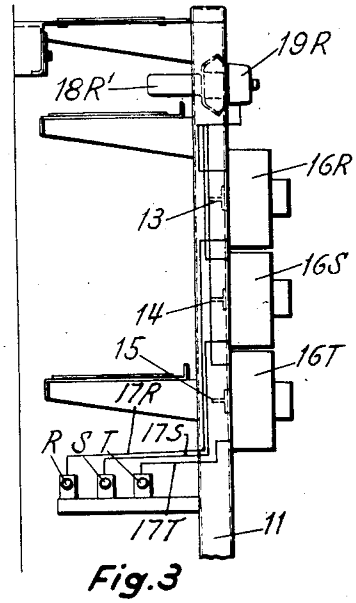
Fig. 3 is a side view of the electrical distribution board in accordance with Fig. 2.

In the case of the electrical distribution board according to the invention and illustrated by Figs. 2 and 3, R, S, T again designate the conductors of a three phase busbar 12 which is arranged in a frame 11. In this electrical distribution board also, the frame 11 contains three connection bars 13, 14, 15 parallel to the conductors R, S, T of the busbar 12, of which the connection bar 13 receives the fuses 16R, the connection bar 14 the fuses 16S and the connection bar 15 the fuses 16T of the branches from the conductors R, S, T of the busbar. Above the connection bar 13 the frame 11 carries a further connection bar 17 on which are arranged switches 18R, 18S, 18T or instead of them, terminals 19R, 19S, 19T. The front part of the casing of the switches 18R, 18S, 18T which are remote control switches with supplementary means of manual operation is in external form and in at least its frontal overall dimensions exactly identical with the terminals 19R, 19S, 19T and has identical and identically arranged connecting elements with the latter. The switches 18R, 18S, 18T and the terminals 19R, 19S, 19T are interchangeable on the connection bar 17. For such branches from the conductors R, S, T of the busbar 12 as do not require switching the connection bar 17 is provided with a terminal 19R, 19S or 19T, while for the branches from the conductors R, S, T of the busbar 12 which require switching the connection bar 17 is equipped instead of with terminals 19R, 19S, 19T, with switches 18R, 18S, 18T, which by virtue of their connecting elements being identically formed and placed with those of the terminals 19R, 19S, 19T, can simultaneously perform the function of such terminals.

Since this eliminates a separate connection bar for the switches 18R, 18S, 18T which are carried on the same connection bar 17 as the terminals 19R, 19S, 19T, the number of steps or stages in the frame 11 of the distribution board is reduced to five. The electrical connections between the branch terminals of the conductors R, S, T of the busbar 12 and the fuses 16R, 16S, 16T, and between the latter and the switches 18R, 18S, 18T or the terminals 19R, 19S, 19T, are in this case likewise provided by standardized types of electric connectors 17R, 17S and 17T but the number of the requisite connector types is reduced owing to the absence of one connection bar or step or stage in the frame 11.

By virtue of the fact that the front part of the casing of the switches 18R, 18S, 18T is in form and overall dimensions identical with the terminals 19R, 19S, 19T which is principally enabled by arranging the switching and actuating elements, insofar as these do not find room in the front of their casing, in a rear portion 18R', 18S', 18T', added to the said front part, it is possible to accommodate the branches from the conductors R, S, T of the busbar in a space which is not wider than the space occupied by the fuses 16R, 16S, 16T. This affords by comparison with known types of distribution boards, a further saving in space and the leads of the branches from the conductors R, S, T of the busbar can be arranged in a clear and accessible manner whereby their assembly is much facilitated.

The fuses 16R, 16S, 16T on the distribution board can alternatively be arranged side by side on the same connection bar. The construction and arrangement according to the invention of the switches 18R, 18S, 18T and the terminals 19R, 19S, 19T then enables two or three switches 18R, 18S, 18T or terminals 19R, 19S, 19T to be arranged in the same width as occupied by the fuses 16R, 16S, 16T, and to make two or three branch leads occupy the same width as the fuses 16R, 16S, 16T, sufficient space being available for fitting a switch 18R, 18S, 18T or a terminal 19R, 19S, 19T for each such branch.

We claim:

1. An electrical distribution board with at least one main bus bar and a plurality of branch circuits connected thereto comprising, in combination, a fuse for each of said branch circuits; at least one supporting bar for supporting said fuses; at least one connecting element at the end of each of said branch circuits, said connecting elements of some of said branch circuits being terminal connectors and said connecting elements for the other of said branch circuits being switches, said terminal connectors and said switches having front portions of identical width and height; a plurality of conductors respectively connecting the fuses of each of said branch circuits with the corresponding connecting element; and a single supporting bar for supporting all of said connecting elements in side by side relation with adjacent connecting elements abutting against each other, whereby the terminal connectors forming the connecting elements of some of the branch circuits may be exchanged against switches without the necessity of rearranging the conductors on the distribution board.

2. An electrical distribution board with a polyphase bus bar and a plurality of polyphase branch circuits connected thereto comprising, in combination, a fuse for each phase of each of said branch circuits; a plurality of supporting bars corresponding in numbers to the phases of said branch circuits being arranged substantially parallel and spaced from each other and the fuses for each branch circuit being respectively arranged on said plurality of supporting bars aligned along a line substantially normal to said supporting bars; at least one connecting element at the end of each phase of each of said branch circuits, said connecting elements of some of said branch circuits being terminal connectors and said connecting elements for the other of said branch circuits being switches, said terminal connectors and said switches having front portions of identical width and height; a plurality of conductors respectively connecting the fuses of each phase of each of said branch circuits with the corresponding connecting element; and a single supporting bar for supporting all of said connecting elements in side by side relation with adjacent connecting elements abutting against each other, whereby the terminal connectors forming the connecting elements of some of the branch circuits may be exchanged against switches without the necessity of rearranging the conductors on the distribution board.

3. An electrical distribution board with a polyphase bus bar and a plurality of polyphase branch circuits connected thereto comprising, in combination, a fuse for each phase of each of said branch circuits; a plurality of supporting bars corresponding in numbers to the phases of said branch circuits being arranged substantially parallel and spaced from each other and the fuses for each branch circuit being respectively arranged on said plurality of supporting bars aligned along a line substantially normal to said supporting bars; at least one connecting element at the end of each phase of each of said branch circuits, said connecting elements of some of said branch circuits being terminal connectors and said connecting elements for the other of said branch circuits being switches, said terminal connectors and said switches having front portions of identical width and height and the connecting elements of each of said branch circuits being arranged symmetrically to the center line of the fuses for the corresponding branch circuit; a plurality of conductors respectively connecting the fuses of each phase of each of said branch circuits with the corresponding connecting element; and a single supporting bar for supporting all of said connecting elements in side by side relation with adjacent connecting elements abutting against each other, whereby the terminal connectors forming the connecting elements of some of the branch circuits may be exchanged against switches without the necessity of rearranging the conductors on the distribution board.

References Cited in the file of this patent

UNITED STATES PATENTS

| | | |
|---|---|---|
| 660,878 | Wright | Oct. 30, 1900 |
| 1,306,344 | Krantz | June 10, 1919 |
| 1,651,953 | Hayden | Dec. 6, 1927 |
| 1,923,893 | Smith | Aug. 22, 1933 |
| 2,010,338 | White | Aug. 6, 1935 |
| 2,315,420 | Harrington | Mar. 20, 1943 |

FOREIGN PATENTS

| | | |
|---|---|---|
| 20,486 | Great Britain | Nov. 18, 1899 |
| 213,123 | Germany | May 1941 |
| 588,505 | Great Britain | May 27, 1947 |
| 651,314 | Great Britain | Mar. 14, 1951 |